United States Patent
Le Leannec et al.

(10) Patent No.: US 7,974,497 B2
(45) Date of Patent: Jul. 5, 2011

(54) METHOD OF MODIFYING THE REGION DISPLAYED WITHIN A DIGITAL IMAGE, METHOD OF DISPLAYING AN IMAGE AT PLURAL RESOLUTIONS, AND ASSOCIATED DEVICE

(75) Inventors: Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 11/722,996

(22) PCT Filed: Feb. 10, 2006

(86) PCT No.: PCT/IB2006/000566
§ 371 (c)(1), (2), (4) Date: Jun. 27, 2007

(87) PCT Pub. No.: WO2006/085223
PCT Pub. Date: Aug. 17, 2006

(65) Prior Publication Data
US 2007/0274608 A1    Nov. 29, 2007

(30) Foreign Application Priority Data

Feb. 14, 2005   (FR) ...................................... 05 01463

(51) Int. Cl.
*G06K 9/32* (2006.01)
*G06K 15/02* (2006.01)
*G09G 5/00* (2006.01)

(52) U.S. Cl. .......................... 382/299; 358/1.2; 345/660
(58) Field of Classification Search .......... 382/232–233, 382/254, 298, 299, 305, 312; 358/1.2; 345/660; 375/240
See application file for complete search history.

(56) References Cited

U.S. PATENT DOCUMENTS 6,054,990 A * 4/2000 Tran ............................... 715/863
(Continued)

FOREIGN PATENT DOCUMENTS

EP   1 420 362   5/2004

OTHER PUBLICATIONS

Zoomify, Inc., "Zoomify Technology & Products—White Paper", pp. 1-12, Oct. 2003, XP002348181, URL:http://www.zoomify.com/downloads/ZoomifyWhitePaper.pdf (retrieved Sep. 2005).

*Primary Examiner* — Kanji Patel
(74) *Attorney, Agent, or Firm* — Fitzpatrick, Cella, Harper & Scinto (57) ABSTRACT

A method of modifying the region displayed in a window of predetermined size within a digital image represented by several resolution levels, between a first region (display_zone) of the digital image displayed at a first resolution (R) and a second region (final_zone) of the digital image including the first region (display_zone) and different from it, comprises the steps of: —selecting (S406), from the stored image parts (bitmap[r]) including the first region (display_zone), a stored image part (bitmap[k]) with a second resolution (k) that is the maximum among the resolutions of said parts, and less than the first resolution (R); —obtaining (S84, SE86) from the selected image part (bitmap[k]) at least one region included in the second region (final_zone) and including the first region (display_zone); —displaying (S88) the region obtained in said window. A corresponding method of displaying an image at plural resolutions is also proposed. Corresponding devices are also provided.

26 Claims, 7 Drawing Sheets

U.S. PATENT DOCUMENTS

| | | | |
|---|---|---|---|
| 6,396,507 B1 | 5/2002 | Kaizuka et al. | 345/661 |
| 6,721,952 B1 * | 4/2004 | Guedalia et al. | 725/38 |
| 6,816,608 B2 * | 11/2004 | Cato | 382/138 |
| 7,236,637 B2 * | 6/2007 | Sirohey et al. | 382/240 |
| 2002/0000998 A1 | 1/2002 | Scott et al. | |
| 2002/0057850 A1 | 5/2002 | Sirohey et al. | 382/299 |
| 2004/0109197 A1 | 6/2004 | Gardaz et al. | 358/1.15 |

\* cited by examiner

METHOD OF MODIFYING THE REGION DISPLAYED WITHIN A DIGITAL IMAGE, METHOD OF DISPLAYING AN IMAGE AT PLURAL RESOLUTIONS, AND ASSOCIATED DEVICE

FIELD

The invention concerns a method of modifying the region displayed within a digital image, a method of displaying an image at plural resolutions and associated devices. Such a method in particular makes it possible to simulate a zoom out, that is to say the transition between the display of a first region and a second region of the digital image larger than the first region.

BACKGROUND

Such methods of modifying the region displayed within a digital image, for example in order to zoom out, are commonly used when it is desired to navigate in a digital image of large size, that is to say to view certain parts of the digital image on a display device by running through the digital image in accordance with the wishes of a user sent to the display system by an interface of mouse or keyboard type.

The digital image as a whole is described by data which may be stored locally by the display system (for example on a hard disk) or remotely, for example on a remote server, in which case the data will have to be downloaded before use by the display system. Moreover, the data are in general encoded in compressed form in order to facilitate their storage and transmission, which however involves a decoding operation at the time it is desired to view (i.e. display) the corresponding image.

The obtainment of displayable data (i.e. requiring only minimal processing by the display system) is thus not in general immediate, for example due to the time of downloading and/or decoding mentioned above.

Thus, when digital images of large size are manipulated (for example in case of navigation within the digital image), the displayable data are determined (i.e. after possible downloading and decoding) with respect only to the regions of interest for the user, i.e. in practice with respect to the region of the image to be displayed at a given time.

When the region to display in the digital image is modified (for example on request by the user of the display system), it is then necessary to obtain and determine the data with respect to the new region to display.

In order to improve the visual reproduction of the transition between the two regions to display, it is however sought to present the user with intermediate views which simulate the movement of a camera from the former region to display to the new region to display.

To perform this transition phase with sufficient fluidity and rapidity with respect to the user's request, it is necessary to have access to information describing the digital image externally of the former region displayed without waiting for the display system to know all the data relative to the new region to display.

To perform this type of transition when the user requests a zoom out during navigation (i.e. he requests the display of a new region of the digital image including the region displayed previously), it has already been proposed to store locally in the display system displayable data used at the preceding steps of the navigation and to use these stored displayable data to display intermediate views (of quality possibly lower but immediately available) during the transition.

In practice, those displayable data are for example constituted by bitmaps as is the case in the ZOOMIFY software of which the general features are given for example by the document "*Zoomify Technology & Products White Paper*" dated October 2003 and available from Zoomify, Inc., Santa Cruz, Calif.

According to this solution, when the user requests a zoom out from a first region of the digital image, the software searches for a bitmap stored locally in the display device and which would describe a second region including the first region and centered thereon, which appears natural as regards giving the user the impression of a zoom out. The bitmap which describes the second region is then used to generate intermediate views with a response time that is perfectly satisfactory since no downloading or decoding operation is necessary.

The bitmap which describes the second region may however have a mediocre resolution, for example when the stored bitmaps with a good resolution (for example immediately below that of the first region) are not centered on the first region and that it is therefore necessary to use a low resolution bitmap to be able to extract views including the first region and centered thereon.

The resolution of the intermediate views is thus not optimum and the quality of the transition phase simulating the zoom out may show this.

SUMMARY

To respond to these problems, i.e. in particular to provide intermediate views with good quality in a zoom out process, the invention provides a method of modifying the region displayed in a window of predetermined size within a digital image represented by several resolution levels, between a first region of the digital image displayed at a first resolution and a second region of the digital image including the first region and different from it, characterized in that it comprises the steps of:
- selecting, from the stored image parts including the first region, a stored image part with a second resolution that is the maximum among the resolutions of said parts, and less than the first resolution.
- obtaining from the selected image part at least one region included in the second region and including the first region;
- displaying the region obtained in said window.

Thus, to generate the intermediate views (or displayed regions obtained), the choice is always made of the image part stored with the best resolution, whatever its positioning with respect to the first region may be.

The second region may then be determined on the basis of the selected image part, which makes it possible to best use the image part of maximum resolution for the zoom out.

Thus, for example, the determining step may comprise a step of defining the selected image part as second region.

When the resolution of the second region is determined on the basis of the resolution of the first region, this definition of the second region permits an optimum quality of zoom out when said maximum resolution is equal to the resolution of the second region.

On the contrary, when said maximum resolution is strictly less than the resolution of the second region, the determining step can comprise a step of defining a region centered on the first region as second region. A centered zoom out is thus performed when this is not to the detriment of the quality of the visual reproduction.

As a variant, the second region (target region) may be defined in a centered manner on a point of the first region (initial region) indicated by the user, for example by means of a mouse, at the time the user requests the zoom out.

Moreover, provision may be made for the obtaining step to comprise the obtainment of a plurality of regions included in the second region and including the first region, in which case a successive display of the plurality of regions obtained is performed.

The obtaining step comprises for example a step of oversampling by a specific factor.

According to an embodiment that is particularly practical, the digital image is represented at each resolution level in an encoded format. The stored parts of the image may then result from a prior step of decoding in accordance with that format, which enables decoding of the views to display at the time of the zoom out to be avoided.

According to one embodiment, the decoding of data relative to the second region and the display, on the basis of the decoded data, of the second region at the end of zoom out, are performed in any case.

Thus a final image is obtained with an optimum quality.

The image parts are for example stored in the form of bitmaps, of which the use is relatively practical.

The stored image parts may be stored locally, for example in random access memory or on a hard disk, which enables easy and rapid access to those data.

The invention also proposes a method of displaying an image at plural resolutions based on hierarchical encoded data representing said image, comprising:

a first displaying step for displaying at least a part of the image at a first resolution, image data used for displaying said part at the first resolution being stored;

a second displaying step for displaying at least a part of the image, at a second resolution higher than the first resolution, after the first displaying step; and a third displaying step for displaying at least a part of the image, at a third resolution lower than the second resolution, after the second displaying step, the part displayed in the third displaying step including the part displayed in the second displaying step, wherein a position of the part displayed in the third displaying step is determined, irrespective of the position of the part displayed in the second displaying step within the part displayed in the third displaying step, so that the part is displayed in the third displaying step by using the stored image data.

This method may also include the optional features mentioned above.

The invention also provides a device adapted to modify the region displayed in a window of predetermined size within a digital image represented by several resolution levels, between a first region of the digital image displayed at a first resolution and a second region of the digital image including the first region and different therefrom, characterized in that it comprises means for selecting, from the stored image parts including the first region, a stored image part with a second resolution, that is the maximum among the resolutions of said parts, and less than the first resolution, means for obtaining from the selected image part at least one region included in the second region and including the first region and means for displaying the region obtained in said window.

The invention also proposes a device for displaying an image at plural resolutions based on hierarchical encoded data representing said image, comprising first displaying means for controlling display of at least a part of the image at a first resolution, including storing means for storing image data used for displaying said part at the first resolution; second displaying means for controlling subsequent display of at least a part of the image, at a second resolution higher than the first resolution; and third displaying means for controlling subsequent display of at least a part of the image, at a third resolution lower than the second resolution, the part displayed by the third displaying means including the part displayed by the second displaying means, including means for determining a position of the part displayed by the third displaying means, irrespective of the position of the part displayed by the second displaying means within the part displayed by the third displaying means, so that the part is displayed by the third displaying means by using data from the storing means.

These devices may have features corresponding to the features of the method referred to above and the similar advantages deriving therefrom.

The invention further provides a means for storing data comprising computer program code instructions for the execution of the steps of the method described above.

Finally the invention provides a computer program containing instructions such that, when said program controls a programmable data processing device, said instructions cause said data processing device to implement the method described above.

Other features and advantages of the invention will appear in the light of the following description, made with reference to the accompanying drawings in which:

DETAILED DESCRIPTION

Figure 1:
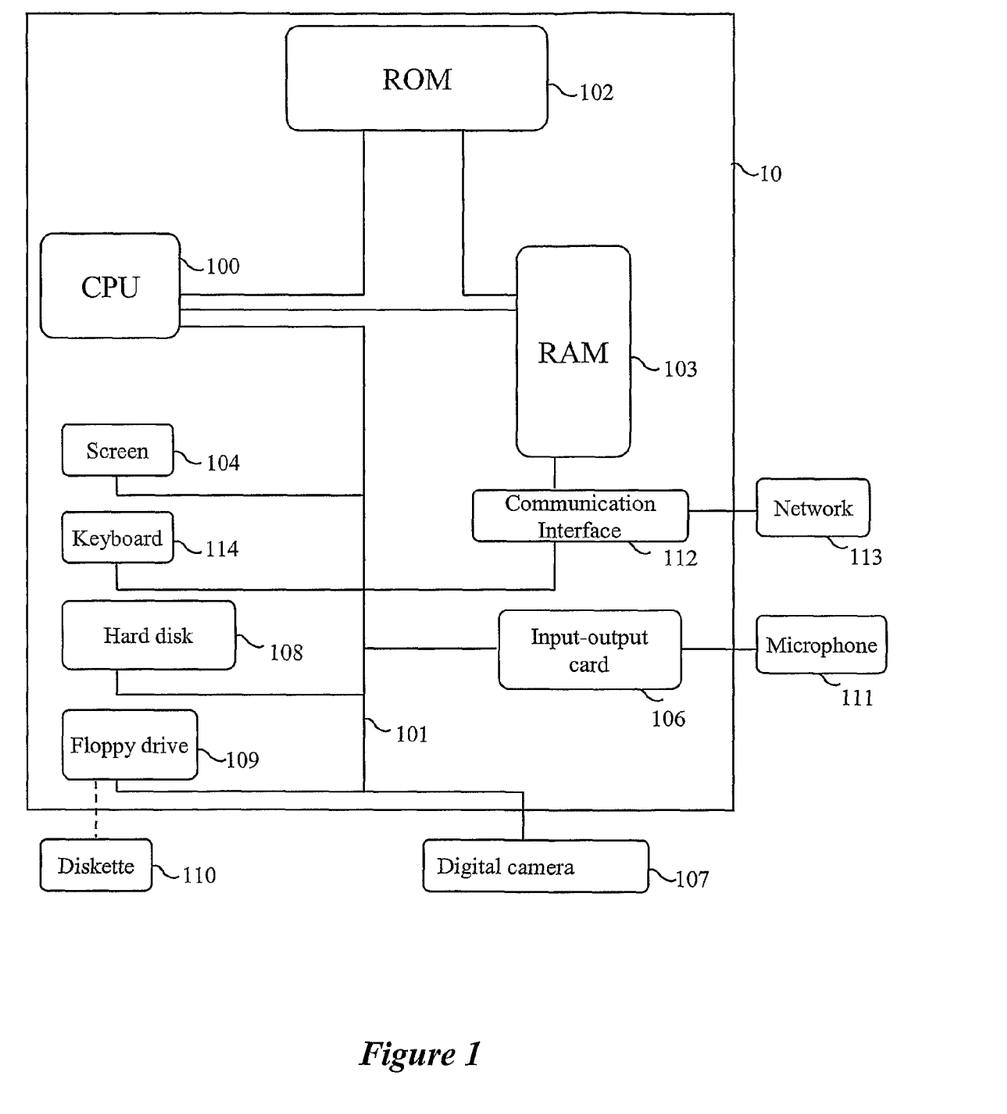
FIG. 1 represents an example of a device implementing the invention.

According to the embodiment represented in FIG. 1, a device implementing the invention is for example a microcomputer 10 connected to different peripherals, for example a digital camera 107 (or a scanner, or any image acquisition or storage means) connected to a graphics card supplying information to be processed according to the invention.

The device 10 comprises a communication interface 112 connected to a network 113 adapted to send digital data.

The device 10 also comprises a storage means 108 such as a hard disk. It also comprises a diskette drive 109. The diskette 110 like the disk 108 may contain data used in the invention as well as the code of the invention which, once read by the device 10, will be stored for example in the hard disk 108, then in a random access memory 103, mentioned below, for execution.

According to a variant, the program enabling the device to implement the invention can be stored in read only memory 102 (referred to as ROM in the drawing).

In a second variant, the program can be received in order to be stored in an identical manner to that described previously via the communication network 113.

The device 10 is connected to a microphone 111 via an input/output card 106.

The same device 10 has a screen 104 making it possible to view the regions or parts of the digital image to display and to serve as an interface with the user who will this be able to navigate in the digital image, on the basis of instructions from him sent to the device 10 using the keyboard 114 or any other means (a mouse for example).

The central processing unit 100 (referred to as CPU in the drawing) will execute the instructions relating to the implementation of the invention, which are stored as previously indicated in the read only memory (or ROM) 102 or in the other storage means.

Thus, on powering up, the decompression programs stored in a non-volatile memory, for example the read only memory 102, are transferred into the random access memory (or RAM) 103, which will then contain the executable code of the invention as well as registers for storing the variables necessary for implementing the invention.

Naturally, the diskettes may be replaced by any form of information carrier such as CD-ROM, or memory card. In more general terms, an information storage means, which can be read by a computer or microprocessor, integrated or not into the device, and which may possibly be removable, stores a program implementing the method according to the invention.

The communication bus 101 affords communication between the different elements included in the microcomputer 10 or connected to it. The representation of the bus 101 is not limiting and, in particular, the central processing unit 100 is able to communicate instructions to any element of the microcomputer 10 directly or via another element of the microcomputer 10.

Figure 2:
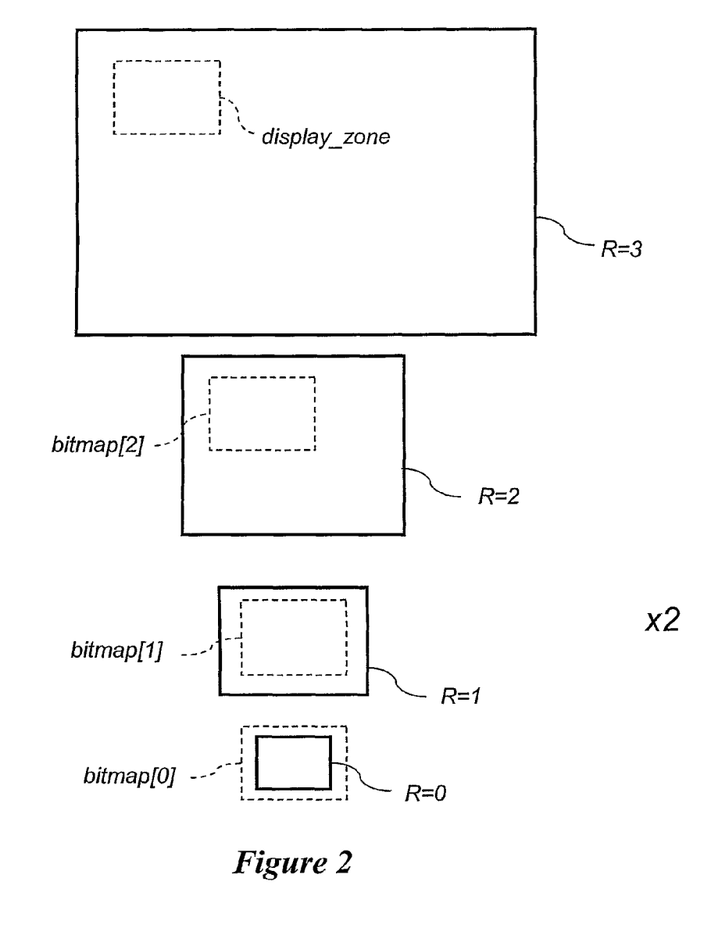
FIG. 2 represents regions of the digital image stored in the form of bitmaps.

FIG. 2 gives a representation of the different bitmaps stored in memory (i.e. stored for example in the random access memory 103 or as a variant on the hard disk 108) at a step of a method of navigation in a digital image at which a relatively good resolution (here a resolution R=3) has been achieved, for example by means of zooms in.

The rectangles in full line of FIG. 2 represent the digital image at the different resolution levels considered (i.e. from R=0 to R=3). The size of the rectangles in full line increases with the resolution to represent the increase in the number of pixels, and thus of the quantity of data, representing the digital image according to the resolution.

For each resolution level, a rectangle in dashed line represents the region of the digital image displayed at the time of the last viewing at the resolution level concerned. The rectangle in dashed line thus also represents the part of the digital image for which the displayable data have been generated, and then stored, here in bitmap form (with the reference "bitmap [R]" to designate the region displayed and stored in bitmap form at a resolution level R).

More particularly, the method provided by the invention, and implemented for example by the central processing unit 100, stores in memory (for example in the random access memory 103 or on the hard disk 108), at each change of resolution, the bitmap bitmap [R] which describes the last region displayed in the resolution R before the change of resolution.

Thus data immediately displayable without decoding or downloading, such as bitmaps, are stored locally (for example in the random access memory 103 or on the hard disk 108), for each resolution level R encountered during the navigation in the digital image.

As a variant, storage could be made only of a predetermined number of bitmaps, for example the bitmap corresponding to the lowest resolution level as well as the last bitmaps encountered, but in a limited number.

It may furthermore be noted that, in the example described here, the bitmaps relative to the different resolutions all occupy the same size in memory, except in the case of the lowest resolution R=0, for which the set of data does not occupy the whole of the display window. This size generally corresponds to the storage size of the image actually displayed on the screen. It is because of this anyway that, in FIG. 2, the rectangles in dotted lines representing the regions displayed during the navigation all have the same dimensions.

Before performing the zoom out as it is described below, it is supposed that what is being viewed is the region designated in FIG. 2 by the reference display_zone at the resolution R=3 of the digital image.

Although not explicitly stated in FIG. 2, the bitmap which describes the region display_zone displayed before the zoom out may be stored in memory. However, as this bitmap "bitmap [3]" is not used in the following portion of the description, this notation has been omitted from the drawings.

Figure 3:
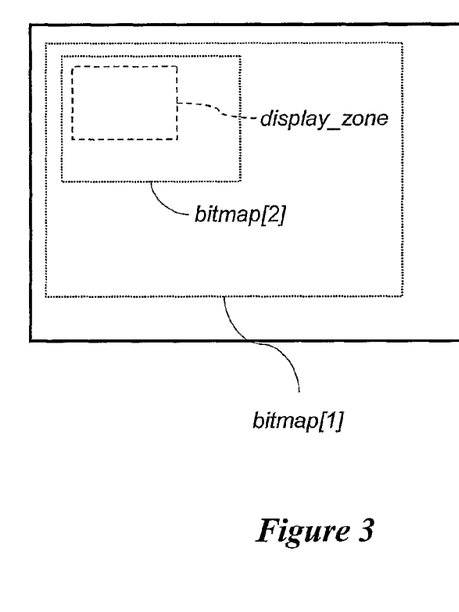
FIG. 3 represents the regions of FIG. 2 to scale and superposed.

In order to clarify the following description of the invention, FIG. 3 represents the displayed region display_zone before zoom out in dashed lines and the regions for which a bitmap has been stored in dotted lines.

In this representation, the digital image is represented in full line and the dimension of the regions represented in dashed and dotted lines (displayed region and regions for which bitmaps are stored) corresponds to the dimension of those regions with respect to the image (and not the quantity of data stored as was the case in FIG. 2).

In the example described here, an increase in the resolution level by a unit corresponds to a multiplication by two of the number of points defining the image (or pixels) in each dimension. It is thus easy to bring a bitmap at a resolution k to a higher resolution level R by enlarging the bitmap by a factor of $2^{R-k}$.

Figure 4:
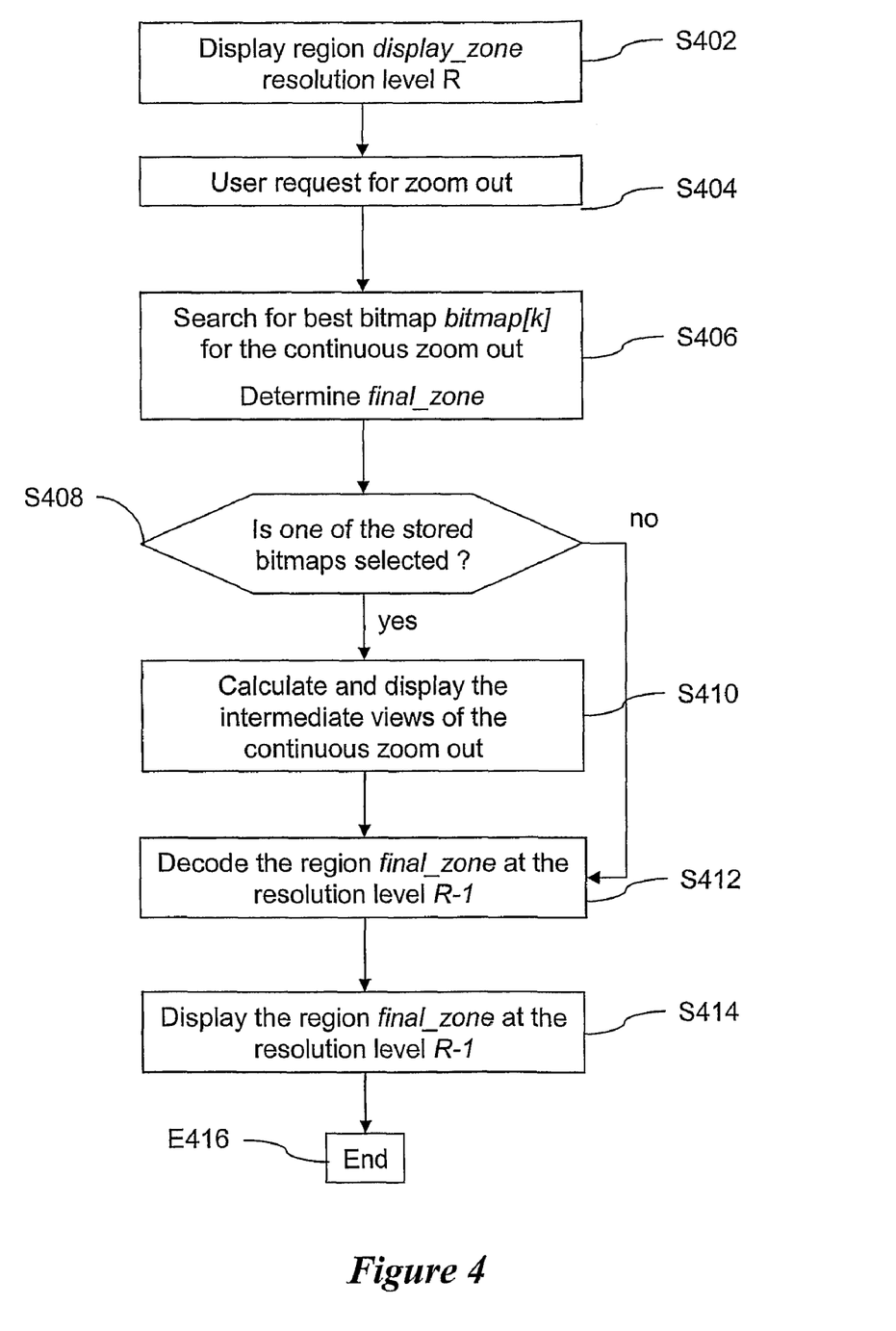
FIG. 4 represents an example algorithm for performing a zoom out in accordance with the teachings of the invention.

FIG. 4 represents the main steps of a method of zoom out performed in accordance with the teachings of the invention.

As this is represented at step S402, it is considered as already stated that the display screen displays the region display_zone of the digital image, which corresponds to a resolution level R (second resolution as termed in some claims).

At this step of the navigation, the user has already run through the digital image (i.e. a part of the image has been displayed) at lower (first) resolutions (in particular r=0, 1 and 2), for each of which a bitmap bitmap [r] has been stored locally as indicated above.

At step S404, the user requests a zoom out to be performed, that is to say in practice the display of a region of the digital image which surrounds and contains the previously displayed region display_zone.

To meet that user request, the method searches at step S406 for the bitmap bitmap [k] which describes a region which includes the displayed region display_zone and surrounds it, with the best possible resolution (which will be denoted in what follows by k).

In more technical terms, this search consists of determining the greatest number r (third resolution) for which a bitmap bitmap [r] has been previously stored and describes a region of the digital image which includes (strictly) the displayed region display_zone, this maximum resolution being denoted k.

In mathematical terms, the following could be written $$k=\max\{r | \text{zone}(\text{bitmap}[R]) \subset 2^{R-r} * \text{zone}(\text{bitmap}[r])\},$$

where zone (bitmap [r]) represents the region of the digital image described by the bitmap bitmap [r].

It may be noted that the bitmap "bitmap [k]" is chosen at step S406 on the sole criteria of a maximum resolution k and of including the previously displayed region display_zone, without taking into account the position of the previously displayed region display_zone in the region represented by the selected bitmap bitmap [k].

At step S406 the region to display at the end of the zoom out (or target region) final_zone is also determined on the basis of the result of the determination of the bitmap bitmap [k] as will be described in detail in FIG. 5.

It is important to note that the final region displayed final_zone (or target region of the zoom out) is not determined before the step of searching for a bitmap describing that region, but that its choice arises on the contrary from the selected bitmap.

As described in more detail in FIG. 5, in the case in which the (third) resolution level k is immediately less than the (second) resolution level R before zoom out (i.e. k=R−1), it is advantageous to choose as target region final_zone the region described by the bitmap bitmap [k] corresponding to the resolution level R−1, which will give the best reproduction for the intermediate views of the zoom out as described below.

It is however necessary to note that the choice of a bitmap of resolution immediately below the resolution R of the initially displayed region display_zone (as is for example the case in the favorable situation represented in FIG. 3) is not always possible, for example when the steps of navigation performed by the user in the resolution R (R=3 in FIG. 3) have displaced the initially displayed region display_zone outside that described by the bitmap bitmap[R−1]: this is because the latter bitmap is no longer capable of providing information on the regions of the digital image surrounding the displayed region display_zone on the basis of which the zoom out is performed. In these unfavorable cases, a bitmap of lower resolution must be used (i.e. of resolution R−2 or less) as described in detail below with reference to FIG. 5.

When the bitmap bitmap [k] of maximum resolution k which describes a region including the initially displayed region display_zone has been selected and the target region final_zone to display at the end of zoom out has been determined, step S408 is proceeded to at which it is verified that step S406 has been performed with success, i.e. that it has been possible to select one of the stored bitmaps.

In the negative, step S412 described below is proceeded to using as target region final_zone the region of resolution R−1 centered on the initial region display_zone.

In the affirmative (in response to the test of step S408) step S410 of calculating and displaying intermediate views is proceeded to, which views enable the user to be given the impression of a zoom out, as is described in more detail with reference to FIGS. 7 and 8.

The calculation of the intermediate views which have just been mentioned uses the bitmap bitmap [k] selected at step S406 as is apparent from the method of calculating those intermediate views detailed below.

Step S412 is then proceeded to at which decoding is performed of the encoded data which describe the digital image in the target region final_zone, received, for example, by downloading from a remote server by means of the communication interface 112.

According to one embodiment that is particularly practical, the encoded data are in accordance with the JPEG2000 standard. This is because, this format is a multi-resolution format which is hierarchical with respect to quality and which enables access for decoding to any part of the image.

This format is all the more adapted to the context of the invention in that it can be used in the context of the JPIP protocol which enables the selective transmission of parts of the JPEG2000 image over a network.

As the target region final_zone is the final image of a zoom out from the region display_zone of resolution R, it can be understood that the target region final_zone is decoded and displayed with a resolution level R−1.

At step S414 the display of the target region final_zone is performed using the decoded data obtained at the preceding step S412.

Preferably, step S412 of decoding data relative to the target region final_zone and step S414 of displaying the target region final_zone on the basis of the decoded data are performed even in the case in which the bitmap bitmap [k] selected at step S406 is the bitmap stored for the resolution R−1 (i.e. in the case in which k=R−1), in order to make sure that the data used for the final display of the target region final_zone are the most recent data for describing that region of the digital image (this is for example important in the case in which the downloading of the encoded data representing the digital image takes place in the background of the process of decoding and displaying described here by means of successive layers as in the case of images in JPEG2000 format and of the JPIP protocol).

The display of the target region final_zone on the basis of the decoded data terminates the zoom out method, as represented in step S416.

Figure 5:
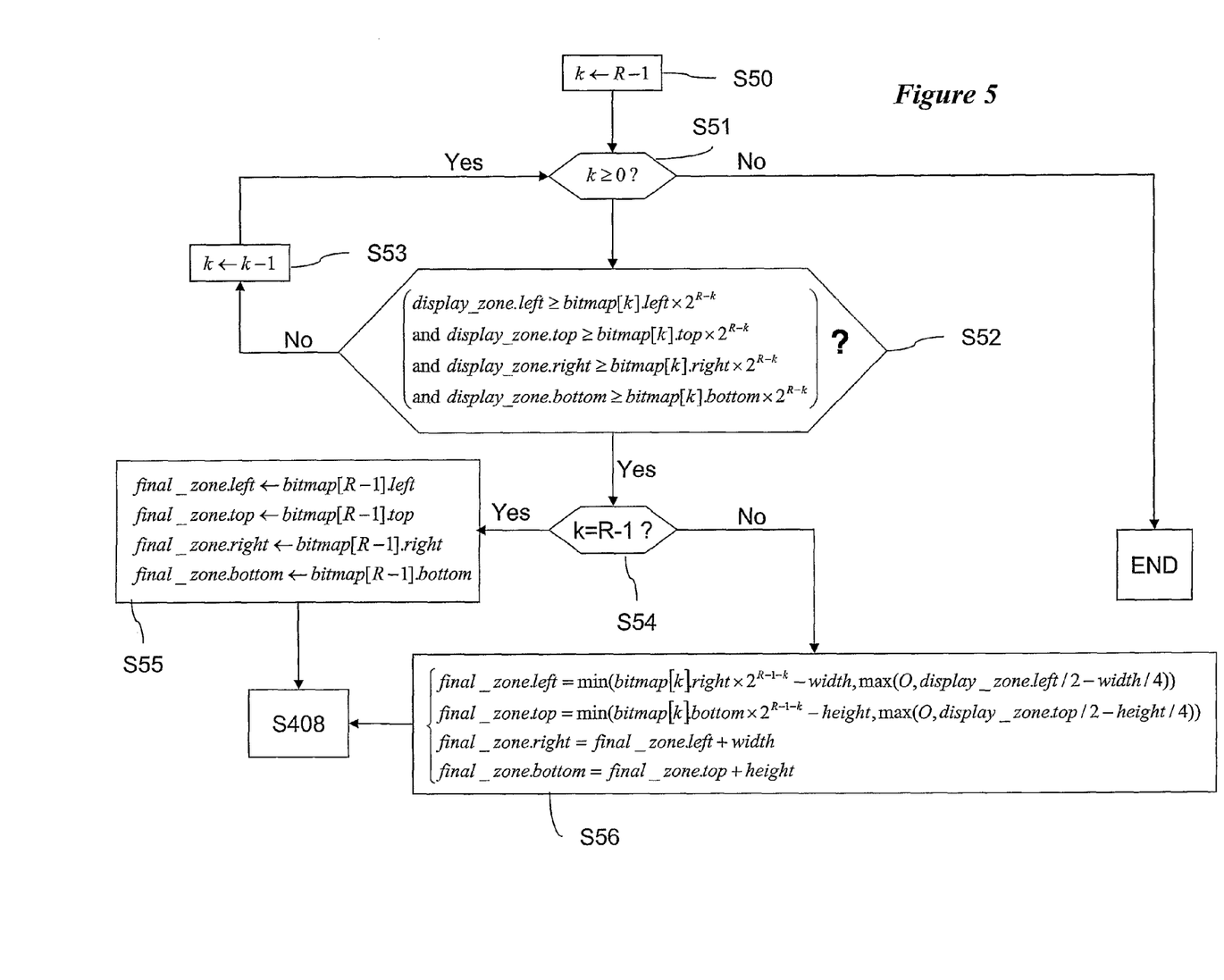
FIG. 5 represents an example algorithm for implementing step S406 of FIG. 4.

FIG. 5 presents an example of a method implementing steps S406 and S408 described above.

The method represented in FIG. 5 commences with a step S50 at which an integer index k is initialized with the value R−1. Next k is compared to 0 (step S51), and if k<0, the algorithm terminates (this is in fact a case in which step S408 described earlier leads to step S412). This means that the currently displayed resolution level R is the level 0, and no zoom out is possible in that case, or else that no stored bitmap fulfills the criterion of selection of step S52.

In the opposite case, the algorithm continues with the comparison between the coordinates of the initially displayed region display_zone and those of the bitmap bitmap[k] brought to the current resolution level R (step S52). As indicated earlier, a bitmap of resolution k is brought to a resolution level R by means of an enlargement by $2^{R-k}$, hence the appearance of this factor in the formulae. This enlargement is performed in practice by means of an oversampling, which may possibly be coupled with a low-pass filtering operation. It may further be noted that at a given resolution level, to define a region or part of the digital image, use is made of:

the number of pixels at that resolution separating the left edge of the region considered from the left edge of the digital image: zone.left;

the number of pixels at that resolution separating the top edge of the region considered from the top edge of the digital image: zone.top;

the number of pixels at that resolution separating the right edge of the region considered from the left edge of the digital image: zone.right;

the number of pixels at that resolution separating the bottom edge of the region considered from the top edge of the digital image: zone.bottom.

If the comparison of the coordinates indicates that the currently displayed region display_zone is spatially included in the rectangle delimiting the bitmap bitmap[k]×$2^{R-k}$ (which circumscribes the region of the digital image described by the bitmap bitmap[k]), then the bitmap bitmap[k] is adapted to be used for the continuous zoom out. The index k then represents the resolution level of the stored bitmap selected for the continuous zoom out and will thus be used for the extraction (i.e. in general terms their obtainment) and the display of the intermediate views (step S410 and algorithm of FIG. 7).

If the test conducted is negative, k is decremented (step S53) and the start of the algorithm is resumed starting with the step of comparing k with 0 (step S51). If k is negative despite R>0, this means that none of the bitmaps previously stored meets the criterion of step S52. The zoom out cannot then be performed in continuous manner, as the intermediate images cannot be constructed. The zoom out is terminated by passing on to step S412 as already stated.

In case a stored bitmap has been selected (test S52 positive), the algorithm continues with the calculation of the coordinates of the image portion of the resolution level R−1 which will be displayed at the end of the zoom out.

For this, k is compared to R−1 (step S54).

If these values are equal, the bitmap used is that of the resolution level directly below the initial level R. Moreover, the process for storage of the bitmaps described earlier is such that all the bitmaps stored are of the same size, that is to say the size of the display space on the screen. Consequently, the coordinates of the region final_zone which will be displayed at the end of the continuous zoom out will necessarily be identical to those of the bitmap bitmap[k]=bitmap[R−1]. In this case, coordinates are thus given to the region final_zone that are equal to those of the region described by the bitmap bitmap[R−1] (step S55).

In the opposite case, it is attempted to perform a zoom out centered on the middle of the initially displayed region display_zone, if that is possible. This is because the size of the bitmap bitmap [k], enlarged by a factor $2^{R-k}$, with R−k≧2, is equal to at least four times the size of the initially displayed image display_zone. Consequently, the same bitmap bitmap [k], enlarged by a factor $2^{R-1-k}$, is of size equal to at least twice the size of the initially displayed image display_zone, and to at least twice the size of the target region final_zone. Consequently, if the initially displayed display_zone is sufficiently far from the edges of the bitmap bitmap[k] enlarged by a factor $2^{R-k}$, it is then possible to perform the zoom out centered with respect to the middle of the initially displayed image display_zone. This gives rise to the following calculation for the coordinates of the target region final_zone:

$$\begin{cases} \text{final\_zone.left} \\ \quad = \min(\text{bitmap}[k].\text{right} \times 2^{R-1-K} - \\ \quad \text{width}, \max(O, \text{display\_zone.left}/2 - \text{width}/4)) \\ \text{final\_zone.top} \\ \quad = \min(\text{bitmap}[k].\text{bottom} \times 2^{R-1-K} - \\ \quad \text{height}, \max(O, \text{display\_zone.top}/2 - \text{height}/4)) \\ \text{final\_zone.right} = \text{final\_zone.left} + \text{width} \\ \text{final\_zone.bottom} = \text{final\_zone.top} + \text{height} \end{cases}$$

where the physical quantities width and height respectively designate the width and the height of the initially displayed region display_zone.

Figure 6:
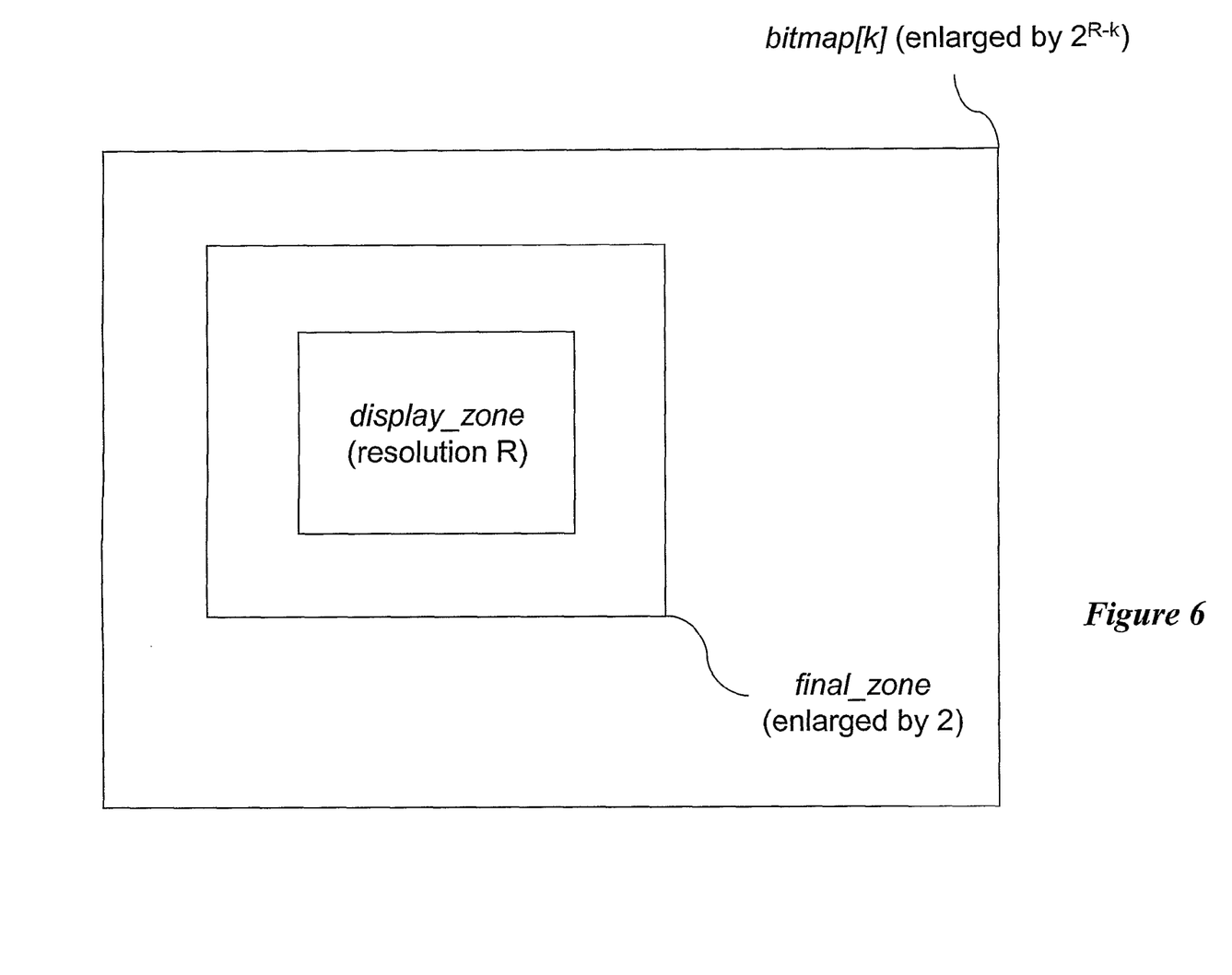
FIG. 6 illustrates the choice made in certain cases of a region centered on the initial region.

Feature 6 illustrates the favorable case in which the initially displayed region display_zone is sufficiently within the bitmap bitmap[k] enlarged by a factor $2^{R-k}$ to be able to perform the zoom out centered on the middle of the initial region display_zone. This is because the multiplication by two of the coordinates of the initially displayed region display_zone provides a rectangle which remains within the bitmap bitmap [k], enlarged by a factor $2^{R-k}$.

In this case the continuous zoom out can be performed centered on the middle of the initial region display_zone.

Once the coordinates have been calculated of the destination region (target region) final_zone in the resolution level R−1, it is possible to proceed to step S410 of calculating and displaying the intermediate views by means of the selected bitmap bitmap [k].

Figure 7:
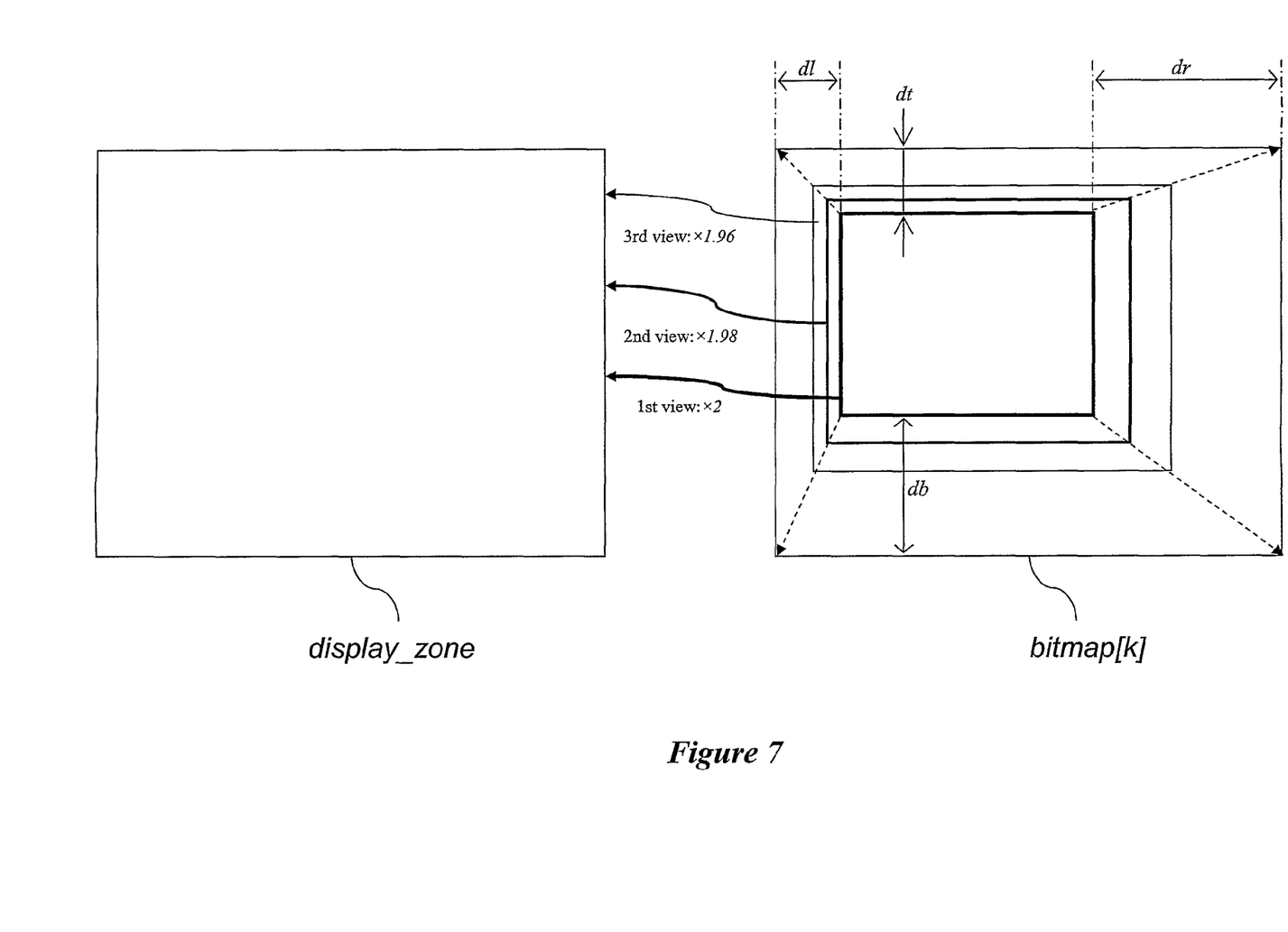
FIG. 7 shows possible examples of extraction and enlargement of image parts for displaying intermediate views.

FIG. 7 illustrates the mechanism implemented for generating the intermediate views to display successively to play the continuous zoom out. The case is taken for example in which the bitmap which has been selected is that of the resolution level directly below the initial resolution level, i.e. k=R−1.

On the left of FIG. 7 there is represented the region display_zone of the digital image initially displayed with the resolution level R. On the right of FIG. 7 there is represented the region of the image delimiting the selected bitmap bitmap [k] of resolution level k.

To generate an intermediate view (or image) of the continuous zoom out, a portion of the bitmap bitmap[k] is extracted, and an enlargement is applied to it (for example by oversampling) such that its size after enlargement is equal to the size of the display region (size of the region display_zone).

The first portion extracted from the bitmap bitmap[k] spatially corresponds to the projection of the initially displayed region display_zone in the resolution level k. Its coordinates with respect to the origin (top left corner) of the bitmap bitmap[k] in the resolution level k are thus given by the following expressions:

$$\begin{cases} \text{extracted\_zone.left} = \text{display\_zone.left} \times 2^{-(R-k)} - \text{bitmap}[k].\text{left} \\ \text{extracted\_zone.top} = \text{display\_zone.top} \times 2^{-(R-k)} - \text{bitmap}[k].\text{top} \\ \text{extracted\_zone.right} = \text{display\_zone.right} \times \\ \quad 2^{-(R-k)} - \text{bitmap}[k].\text{right} \\ \text{extracted\_zone.bottom} = \text{display\_zone.bottom} \times \\ \quad 2^{-(R-k)} - \text{bitmap}[k].\text{bottom} \end{cases}$$

The enlargement factor applied to any extracted portion of bitmap[k] is:

$$\frac{\text{display\_zone.width}}{\text{extracted\_zone.width}} = \frac{\text{display\_zone.height}}{\text{extracted\_zone.height}}, \quad (1)$$

where the width of a region is denoted zone.width and its height zone.height.

In the case of the first extracted portion, this ratio is equal to $2^{R-k}$.

Once this first portion has been displayed, a new portion to extract from the bitmap bitmap[k] is calculated. As illustrated in FIG. 7, this new portion spatially surrounds the preceding one, and its enlargement factor is slightly less, such that its enlarged version has an identical size to that of display_zone.

The successive portions extracted are determined by making the four corners of the first extracted portion advance along the four arrows drawn in dashed lines in FIG. 7. These four arrows are determined by the differences in coordinates between the first extracted image and the coordinates of the final region to display final_zone (or target region, provided by the algorithm of FIG. 5), brought to the resolution level k.

These differences are given by:

$$\begin{cases} dl = \text{display\_zone.left} \times 2^{-1} - \text{final\_zone.left} \\ dt = \text{display\_zone.top} \times 2^{-1} - \text{final\_zone.top} \\ dr = \text{display\_zone.right} \times 2^{-1} - \text{final\_zone.right} \\ db = \text{display\_zone.bottom} \times 2^{-1} - \text{final\_zone.bottom} \end{cases} \quad (2)$$

These parameters are illustrated in FIG. 7 and represent the displacements, respectively to the left, the top, the right and the bottom, to go through between the first portion to extract and the last portion to extract. For this, a floating parameter λ is made to vary from 0.00 to 1.00. For each value of λ, the rectangular portion is extracted corresponding to displacements, respectively to the left, the top, the right and the bottom, by λ×dl, λ×dt, λ×dr and λ×db. In other words, a rectangular portion extracted_zone is extracted from the bitmap bitmap[k], of which the coordinates with respect to the origin of that bitmap are given by:

$$\begin{cases} \text{extracted\_zone.left} = (\text{final\_zone.left} + \lambda \times dl) \times \\ \quad 2^{-(R-1-k)} - \text{bitmap}[k].\text{left} \\ \text{extracted\_zone.top} = (\text{final\_zone.top} + \lambda \times dt) \times \\ \quad 2^{-(R-1-k)} - \text{bitmap}[k].\text{top} \\ \text{extracted\_zone.right} = (\text{final\_zone.right} + \lambda \times dr) \times \\ \quad 2^{-(R-1-k)} - \text{bitmap}[k].\text{right} \\ \text{extracted\_zone.bottom} = (\text{final\_zone.bottom} + \lambda \times db) \times \\ \quad 2^{-(R-1-k)} - \text{bitmap}[k].\text{bottom}. \end{cases} \quad (3)$$

For each portion so extracted, an enlargement by a ratio given by equation (1) is applied to it and the result of that enlargement is displayed on the screen.

Figure 8:
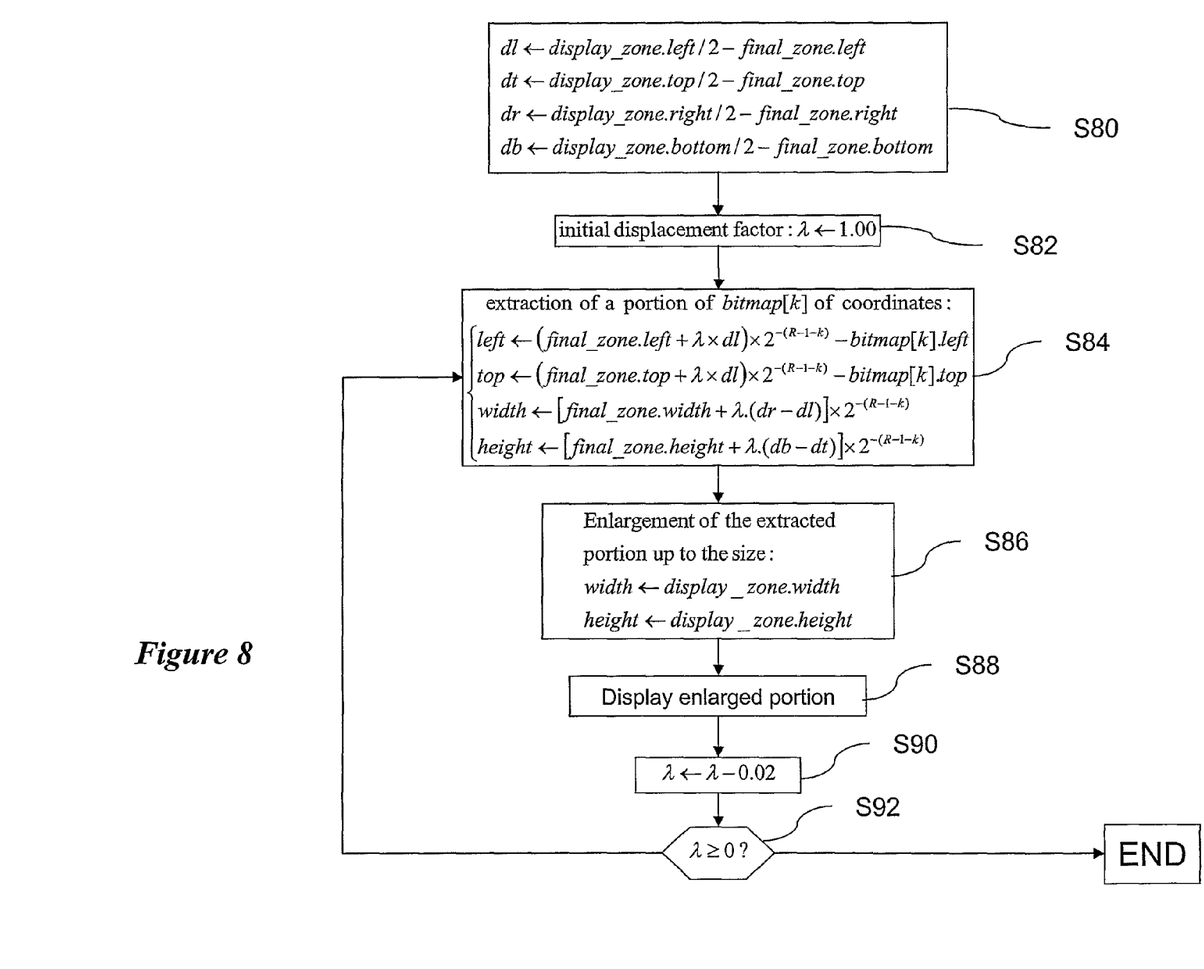
FIG. 8 represents an example algorithm for implementing step S410 of FIG. 4.

FIG. 8 describes an algorithm example for production of the intermediate views of continuous zoom out. The inputs to this algorithm are the following:

the initial resolution level R;
the region initially displayed on the screen display_zone at that resolution level R;
the selected bitmap bitmap[k] used to form the intermediate views of the continuous zoom out.

First of all, the parameters of displacement between the first and the last portion of bitmap to extract are calculated (step S80), in accordance with equation (2) above.

Next, the parameter λ, making it possible, during the continuous zoom out, to calculate the displacement between the first extracted portion of bitmap[k] and the current portion to extract, is initialized to the value 1 (step S82).

The following portion of the algorithm consists of extracting from the selected bitmap bitmap[k] the rectangular image portion of which the coordinates are presented in FIG. 7 and provided by equation 3 (step S84).

This extracted image portion extracted_zone next undergoes an enlargement (step S86) so as to make it of identical size, in width and height, to the initial region display_zone (i.e. to the size of the display). The scaling factor is given by equation (1).

Finally, the image portion extracted_zone so extracted and enlarged is displayed on the screen 104 (step S88).

The following portion of the algorithm provides for reducing λ, for example by a constant value, by 0.02 in this specific embodiment of the invention (step S90). The parameter λ is next compared to 0 (step S92). If it is greater than or equal to 0, the algorithm loops on step S84 of extracting the next intermediate image to generate. Otherwise, the algorithm for extracting and displaying intermediate views terminates and the overall algorithm of FIG. 4 then proceeds with the decoding (step S412) and display (step S414) of the image region final_zone of the digital image (here JPEG2000) in the resolution level R−1, thus finishing the zoom out process.

The embodiment which has just been described with its possible variants only represents examples of implementation of the invention.

The invention claimed is:

1. A method of modifying a region displayed in a window of predetermined size within a digital image represented by several resolution levels, from a first region of the digital image displayed at a first resolution to a second region of the digital image including the first region and different from the first region, comprising the steps of:
   selecting, from stored image parts each including the first region, a stored image part with a second resolution that is the maximum among the resolutions of said stored image parts, and that is less than the first resolution;
   obtaining from the selected image part at least one region included in the second region and including the first region; and
   displaying the obtained region in said window.

2. A method according to claim 1, further comprising a step of determining the second region on the basis of the selected image part.

3. A method according to claim 2, wherein the determining step comprises a step of defining the selected image part as the second region.

4. A method according to claim 3, wherein the resolution of the second region is determined on the basis of the resolution of the first region, and wherein the defining step is implemented when said maximum resolution is equal to the resolution of the second region.

5. A method according to claim 2, wherein the resolution of the second region is determined on the basis of the resolution of the first region, and wherein the determining step comprises a step of defining a region centered on the first region as the second region when said maximum resolution is strictly less than the resolution of the second region.

6. A method according to claim 2, wherein the resolution of the second region is determined on the basis of the resolution of the first region, and wherein the determining step comprises a step of defining a region centered on a point of the first region indicated by the user as the second region when said maximum resolution is strictly less than the resolution of the second region.

7. A method according to claim 1, wherein the obtaining step comprises the obtainment of a plurality of regions included in the second region and including the first region, and wherein the obtaining step comprises a successive display of the plurality of obtained regions.

8. A method according to claim 1, wherein the obtaining step comprises a step of over-sampling by a specific factor.

9. A method according to claim 1, wherein the digital image is represented at each resolution level in an encoded format.

10. A method according to claim 9, wherein said stored parts of the image result from a prior step of decoding in accordance with said format.

11. A method according to claim 1, further comprising the steps of:
decoding data relative to the second region; and
on the basis of the decoded data, displaying the second region after the display of the obtained region.

12. A method according to claim 1, wherein the image parts are stored in the form of bitmaps.

13. A method according to claim 1, wherein the stored image parts are stored locally.

14. A method of displaying an image at plural resolutions based on hierarchical encoded data representing said image, comprising:
a first displaying step for displaying at least a part of the image at a first resolution, image data used for displaying said part at the first resolution being stored;
a second displaying step for displaying at least a part of the image, at a second resolution higher than the first resolution, after the first displaying step; and
a third displaying step for displaying at least a part of the image, at a third resolution lower than the second resolution, after the second displaying step, the part displayed in the third displaying step including the part displayed in the second displaying step,
wherein a position of the part displayed in the third displaying step is determined, irrespective of the position of the part displayed in the second displaying step within the part displayed in the third displaying step, so that the part is displayed in the third displaying step by using the stored image data.

15. A device constructed to modify a region displayed in a window of predetermined size within a digital image represented by several resolution levels, from a first region of the digital image displayed at a first resolution to a second region of the digital image including the first region and different from the first region, comprising:
means for selecting, from stored image parts each including the first region, a stored image part with a second resolution that is the maximum among the resolutions of said stored image parts, and that is less than the first resolution;
means for obtaining from the selected image part at least one region included in the second region and including the first region; and
means for displaying the obtained region in said window.

16. A device according to claim 15, further comprising means for determining the second region on the basis of the selected image part.

17. A device according to claim 16, wherein the determining means comprise means for defining the selected image part as the second region.

18. A device according to claim 17, wherein the resolution of the second region is determined on the basis of the resolution of the first region, and wherein the means for defining the selected image part as the second region operate when said maximum resolution is equal to the resolution of the second region.

19. A device according to claim 16, wherein the resolution of the second region is determined on the basis of the resolution of the first region, and wherein the determining means comprise means for defining a region centered on the first region as the second region when said maximum resolution is strictly less than the resolution of the second region.

20. A device according to claim 16, wherein the resolution of the second region is determined on the basis of the resolution of the first region, and wherein the determining means comprise means for defining a region centered on a point of the first region indicated by the user as the second region when said maximum resolution is strictly less than the resolution of the second region.

21. A device according to claim 15, further comprising:
means for decoding data relative to the second region; and
means for displaying, on the basis of the decoded data, the second region after the display of the obtained region.

22. A device according to claim 15, wherein the stored image parts are bitmaps.

23. A device according to claim 15, further comprising means for local storage of the stored image parts.

24. A device for displaying an image at plural resolutions based on hierarchical encoded data representing said image, comprising:
first displaying means for controlling display of at least a part of the image at a first resolution, including storing means for storing image data used for displaying said part at the first resolution;
second displaying means for controlling subsequent display of at least a part of the image, at a second resolution higher than the first resolution, and
third displaying means for controlling subsequent display of at least a part of the image, at a third resolution lower than the second resolution, the part displayed by the third displaying means including the part displayed by the second displaying means, including means for determining a position of the part displayed by the third displaying means, irrespective of the position of the part displayed by the second displaying means within the part displayed by the third displaying means, so that the part is displayed by the third displaying means by using data from the storing means.

25. A non-transitory data storage means storing computer program code instructions for executing the steps of a method according to claim 1.

26. A computer program stored on a non-transitory computer-readable medium, containing instructions such that, when said program controls a programmable data processing device, said instructions cause said data processing device to implement a method according to claim 1.

* * * * *